(12) United States Patent
Woodward et al.

(10) Patent No.: US 9,322,992 B2
(45) Date of Patent: Apr. 26, 2016

(54) DEVICES AND METHODS FOR MULTIMODE LIGHT DETECTION

(71) Applicant: TT GOVERNMENT SOLUTIONS, INC., Basking Ridge, NJ (US)

(72) Inventors: Ted K. Woodward, Basking Ridge, NJ (US); Paul Toliver, Basking Ridge, NJ (US); Ibrahim T. Ozdur, Basking Ridge, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 137 days.

(21) Appl. No.: 14/166,975

(22) Filed: Jan. 29, 2014

(65) Prior Publication Data

US 2014/0209798 A1     Jul. 31, 2014

Related U.S. Application Data

(60) Provisional application No. 61/757,975, filed on Jan. 29, 2013.

(51) Int. Cl.
*G02B 6/04*     (2006.01)
(52) U.S. Cl.
CPC ........................................ *G02B 6/04* (2013.01)
(58) Field of Classification Search
CPC .................................................... G01J 3/2803
USPC ............................... 250/227.28; 356/28, 328
See application file for complete search history.

(56) References Cited

U.S. PATENT DOCUMENTS

| 8,190,030 B2 | 5/2012 | Leclair et al. |
| 2012/0200854 A1* | 8/2012 | Bland-Hawthorn .......... 356/328 |
| 2015/0185246 A1* | 7/2015 | Dakin et al. .................... 356/28 |

OTHER PUBLICATIONS

William C. Stone, et al., "Performance Analysis of Next-Generation LADAR for Manufacturing, Construction, and Mobility," NISTIR 7117, May 2004, 198 pages.
P. Gatt, et al., "Coherent optical array receivers for the mitigation of atmospheric turbulence and speckle effects," Appl. Opt. 35, 5999-6009 (1996), 11 pages.
J. Sakaguchi, et al., "Propagation Characteristics of Seven-core Fiber for Spatial and Wavelength Division Multiplexed 10-Gbit/s Channels," OFC 2011 paper OWJ2, 2011, 3 pages.
W.R. Leeb, et al., "Aperture dependence of the mixing efficiency, the signal-to-noise ratio, and the speckle number in coherent lidar receivers," App. Optics, v. 37 (15), pp. 3413-3148, 1998.

(Continued)

*Primary Examiner* — Renee D Chavez
(74) *Attorney, Agent, or Firm* — Heslin Rothenberg Farley & Mesiti P.C.

(57) ABSTRACT

Multimode light detectors are provided, which combine a plurality of measurements of light to detect information, using a mode transformation device. The light may be light from one or more objects, and the mode transformation device may be configured to transform the light into many single mode light beams. Each measurement of the light may be a measurement of a corresponding single mode light beam. The multimode detectors may include one or more optical receivers, configured to mix one or more single mode light beams with one or more local oscillators, respectively. Methods are provided for detecting information of objects, including obtaining light from the objects, transforming the light into multiple single mode light beams, and collecting (and/or combining) measurements of the single mode light beams.

21 Claims, 8 Drawing Sheets

(56) References Cited

OTHER PUBLICATIONS

P. Gatt, et al., Laser Radar Detection Statistics: A Comparison of Coherent and Direct Detection Receivers, Applied Optics, vol. 23, Issue 19, pp. 3421-3427 (1984); http://dx.doi.org/10.1364/AO.23.003421.

Petter Lindelow, "Fiber Based Coherent lidars for remote wind sensing," Ph.D. Thesis, 2007. Technical University of Denmark, 186 pages.

S. Kameyama, "Development of Fiber-based LIDAR systems for sensing atmospheric wind and carbon dioxide concentration," Ph.D. Thesis, 2011, Chiba University, 155 pages.

Martin Mark, "A Comparison of Free Space and Fiber Mixer Performances in a Heterodyne Laser Radar," Aerospace and Electronics Conference, 1992. NAECON 1992., Proceedings. pp. 1256-1262, 1992.

J.Y. Wang, "Detection Efficiency of Coherent Optical Radar," App. Optics, pp. 3421-3427, 1984.

Nato, AG-300-V26 on Airborne Laser Systems Testing and Analysis, Annex B., 2010, 14 pages.

S.G. Leon-Saval, "Multimode Fiber Devices with Single-Mode Performance," Opt. Lett. v.30 (19), p. 2545-2547, 2005.

D. Noordegraaf, "Nineteen-port Phototonic Lantern with Multimode Fiber Delivery," Opt. Lett., v. 37(4), p. 452-454.

Anthony J. Horton, et al., "Coupling Light into Few-Mode Optical Fibres I: The Diffraction Limit", Optics Express, v. 15 (4) p. 1443-1453.

S.G. Leon-Saval, et al., "Photonic lanterns: a study of light propagation in multimode to single-mode converters", Optics Express 8439, vol. 18, No. 8, Apr. 12, 2010, 10 pages.

\* cited by examiner

US 9,322,992 B2

DEVICES AND METHODS FOR MULTIMODE LIGHT DETECTION

CROSS-REFERENCE TO RELATED APPLICATION

The present invention claims priority from U.S. provisional patent application No. 61/757,975, filed Jan. 29, 2013, which is hereby incorporated herein by reference in its entirety.

FIELD OF THE INVENTION

The present invention relates to detectors and methods of detecting information, and more particularly, to devices and methods for multimode light detection.

BACKGROUND OF THE INVENTION

Coherent optical detection methods have been used in a variety of detection applications, including, for example, light detection and ranging (LIDAR) applications. Coherent optical detection methods make use of phase and spatial mode correlations of reflected light with a local oscillator, to enhance the signal to noise ratio of detected information. In a case where light has been scattered by a diffuse object, and/or transmitted light has not been sufficiently focused on an object, the reflected light may not be well matched to the local oscillator and information detected by coherent optical methods may be degraded (for example, have a low signal to noise ratio).

BRIEF SUMMARY

The shortcomings of the prior art are overcome, and additional advantages are provided, through the provision, in one aspect, of device that includes a multimode detector. The multimode detector is configured to obtain light from one or more objects, the light having multiple modes, and combine a plurality of measurements of the light to detect information of the one or more objects. The multimode detector includes a mode transformation device, the mode transformation device being configured to transform the light into a plurality of single mode light beams. Each measurement of the plurality of measurements is a measurement of a corresponding single mode light beam of the plurality of single mode light beams.

In another aspect, a method for detecting information of one or more objects is presented. The method includes: obtaining light from the one or more objects, the light having multiple modes; transforming the light into a plurality of single mode light beams; and collecting a plurality of measurements of the light to detect the information of the one or more objects. Each measurement of the plurality of measurements is a measurement of a corresponding single mode light beam of the plurality of single mode light beams.

In a further aspect, a device is presented. The device includes: a transmitter, the transmitter being configured to transmit a light beam; and a multimode detector, the multimode detector being configured to obtain the light beam, the light beam having a plurality of modes. The multimode detector combines a plurality of measurements of the light beam to detect information. Each measurement of the plurality of measurements of the light beam corresponds to one or more modes of the plurality of modes of the light beam.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
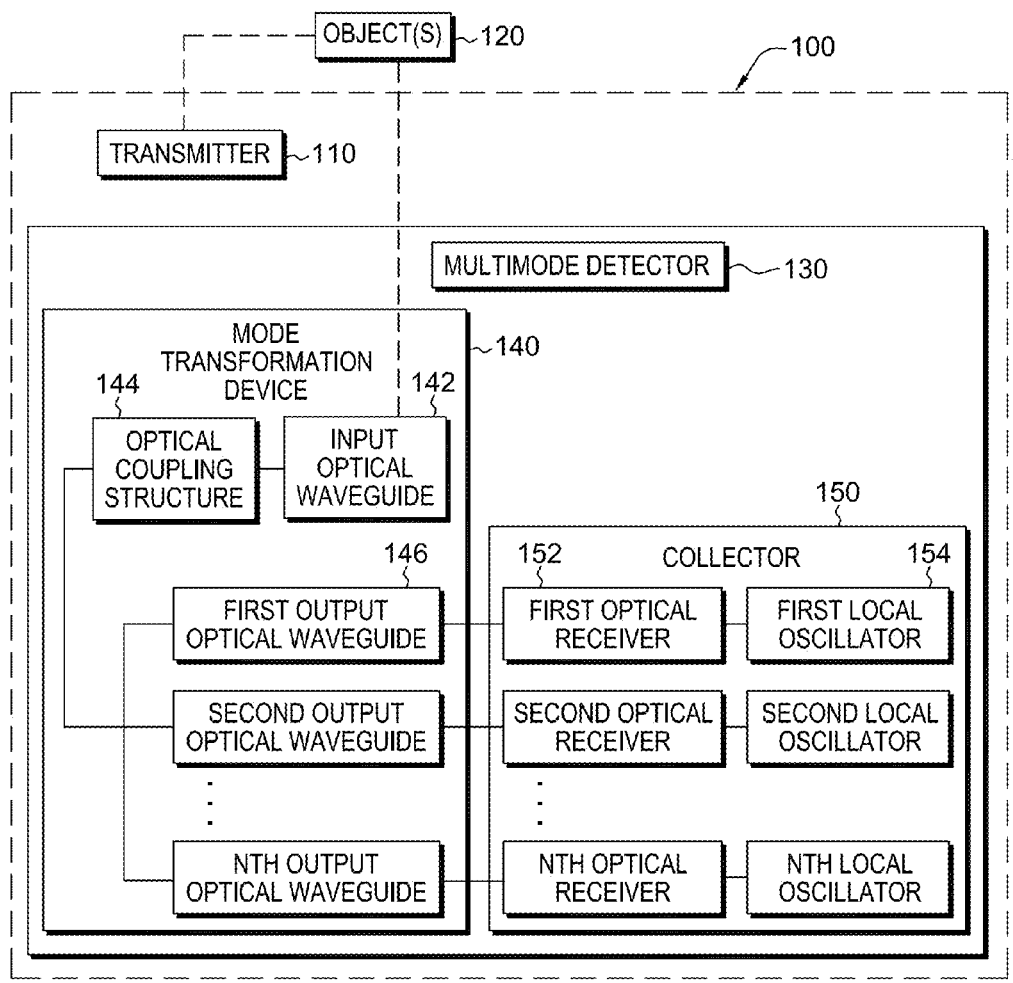
FIG. 1 is a block diagram of a device having a multimode detector with a mode transformation device, in accordance with one or more aspects of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, multimode detectors for detecting information from light, such as reflected or transmitted light, and methods thereof. As described above, coherent optical methods make use of a local oscillator, having a known phase and spatial mode, to detect information from light. However, the light may have multiple spatial modes (modes), and coherent optical methods may only detect information from one of the modes, for example the mode that is correlated with the mode of the local oscillator. In such methods, information content of other modes, which are not correlated with the mode of the local oscillator, will be lost, and the detected information will have a reduced signal to noise ratio. These deficiencies are more pronounced when the object is within the near field, or within the Fraunhofer distance, of a transmitter that is part of a detector system.

Attempts to overcome the deficiencies of coherent detection methods have been made, including by focusing a transmitted light beam at objects. However, focusing may require mechanical adjustment of a lens, resulting in increased complexity, size, weight, and power requirements, as well as requiring position information of the object, and introducing delay in the measurement. Therefore, such methods constrain the utility of coherent detection methods.

Using the techniques disclosed herein, such deficiencies may be mitigated by making multiple measurements of the light, and combining the measurements to detect information. By employing such techniques, including collecting more signal than a corresponding single mode measurement system, the signal to noise ratio of the detected information is enhanced, and will be greater than the signal to noise ratio of each individual measurement of the information.

The techniques described herein may be employed to detect a variety of different desired types of information regarding a variety of different objects. As used herein, objects include, but are not limited to atoms, molecules, atmospheric information (e.g. aerosols, chemicals, or clouds), aircraft, ground terrain, ocean currents, sea floors, and/or any other soft or hard target objects about which information may be desired. In one embodiment of the present technique, this information includes but is not limited to information related to position, velocity, temperature, chemical composition, identity, and/or any other information about objects which may be desired.

The techniques described herein may be used in a variety of different applications, including geological applications, defense applications, security verification, surveying, mechanical assembly, robotics, entertainment, and so forth. For instance, the information to be detected may be three dimensional situational awareness and terrain mapping. In one example, the information may be facial recognition of a person, for authentication purposes. In another example, the information may relate to meteorological phenomenon, used by a weather service to predict short term weather patterns, or to analyze long term trends. In a further example, the information may be position, velocity, and/or identification information of a hard target, such as an aircraft or satellite.

Reference is made below to the drawings, which are not drawn to scale for ease of understanding, wherein the same reference numbers used throughout different figures designate the same or similar components.

FIG. 1 is a block diagram of an embodiment of device 100, in accordance with one or more aspects of the present invention. As illustrated, in one example, device 100 has a transmitter 110 and a multimode detector 130. In another example, transmitter 110 is separate from device 100. As may be understood, device 100 may have multiple different form-factors, depending upon the particular desired application for its usage, ranging from hand-held portable device format, to large scale installations with multiple subcomponents installed in a large area, including on buildings, mountain-tops, aircraft, and/or satellites.

In one illustrative example of operation of device 100, transmitter 110 is configured to transmit a transmitted light beam, which may be a coherent light beam, such as a collimated or focused light beam or laser beam. In one embodiment, the transmitted light beam is transmitted towards objects 120, which reflect or scatter at least a portion of the transmitted light beam, back towards device 100. In another embodiment, the transmitted light beam is sent directly or indirectly from transmitter 100, through a medium, such as an atmosphere, free space, or objects, towards device 100.

In one embodiment of device 100, after the light has been reflected from object(s) 120, multimode detector 130 obtains the light, and makes measurements of the light. In such an embodiment, the light has multiple modes, and having multiple modes means that multiple modes of the light are excited in multimode detector 130 (for example, in a multimode optical waveguide of multimode detector 130). To be more specific, as light propagates, for example from one or more objects, through an atmosphere, to a multimode detector, which includes a multimode optical fiber, the light will propagate subject to relevant physical equations and boundary conditions imposed by the propagation medium, as further discussed with reference to FIG. 4 below.

In an embodiment, multimode detector 130 combines the measurements of the light to detect the desired information, including information of the objects. As described above, the information may include, but is not limited to, position, velocity, chemical, and/or other information of or related to objects 120. In other examples, the information may relate to information sent by the transmitter, and/or may relate to an atmosphere and/or objects through (or around) which the light may pass en route to multimode detector 130.

To facilitate making the measurements of the light, in one example, multimode detector 130 includes a mode transformation device 140. In an embodiment of multimode detector 130, mode transformation device 140 is configured to transform the light into multiple single mode light beams, each of which can then be individually measured, using one or more single mode optical receivers.

By way of example, in an embodiment of the present invention, the multiple single mode light beams include a first single mode light beam corresponding to a first combination of the multiple modes of the light, and second single mode light beam corresponding to a second combination of the multiple modes of the lights. In such an embodiment, the first combination and the second combination are different combinations. In a similar manner, there can be any number of single mode light beams, and each single mode light beam can correspond to a different combination of the multiple modes of the light. A combination may be a superposition, a linear combination, or a non-linear combination.

In this example embodiment, measurements of the first and second single mode light beams have a certain information content, which can be characterized by first and second signal to noise ratios, respectively. Continuing with this example, after making the measurements, multimode detector 130 combines these measurements to obtain information about the object. The information combined by multimode detector 130 has a higher signal to noise ratio than either of the individual measurements, because each single mode light beam has only a distinct subset of the total signal, as compared to the other single mode light beam. More significantly, the multimode detector 130 can collect more signal than a corresponding single mode detector operating in its place. In a similar manner, multimode detector 130 can combine any number of measurements from any number of single mode light beams, to further enhance the signal to noise ratio of the detected information. The detected information may be used in a variety of applications, such as autonomous navigation, wide area terrain mapping, standoff face recognition, machine vision, and/or remote assembly.

In one specific example, to obtain the measurements, the multimode detector 130 includes multiple optical receivers 152 having a corresponding local oscillator 154. In this embodiment, each optical receiver 152 is configured to mix a single mode light beam with a corresponding local oscillator 154 to obtain a measurement at a photodetector. As may be understood, the local oscillator could be an optical signal that is known to have correlated spatial mode, frequency, and phase with the single mode light beam (e.g. coherent mixing).

In order to transform the light into multiple single mode light beams, in one embodiment, mode transformation device 140 includes an input optical waveguide 142, optically coupled to multiple output optical waveguides 146, by an optical coupling structure 144. In such a case, the light is obtained by and propagated to input optical waveguide 142, and each output optical waveguide 146 propagates one of the single mode light beams. In one implementation, optical coupling structure 144 is capable of transforming the light into the multiple single mode light beams.

By way of example, input optical waveguide 142 may be a multimode optical waveguide, such as a multimode optical fiber, and output optical waveguides 146 may be single mode optical waveguides, such as single mode optical fibers. In one specific case, the optical fibers are coupled by a tapered region, which is between the multimode optical fiber and the single mode optical fibers, as to be explained in further detail below, with respect to FIG. 4.

In an embodiment of device 100, input optical waveguide 142 is a multimode optical waveguide, and when the light propagates within the multimode optical waveguide, the light excites multiple modes therein. In this embodiment, the multiple modes of the light propagate towards optical coupling structure 144, and then transform into multiple single mode light beams, each of which is a superposition of the multiple modes of the light, and propagates in the output optical waveguides 146. In this specific embodiment, the energy of the multiple modes of the light is transformed into the energy of the individual singe mode light beams. In other examples, there may be some energy loss in the transformation process.

By way of summary, FIGS. 2A-2D illustrate aspects of embodiments of methods for detecting information of objects, in accordance with one or more aspects of the present invention.

Figure 2A:
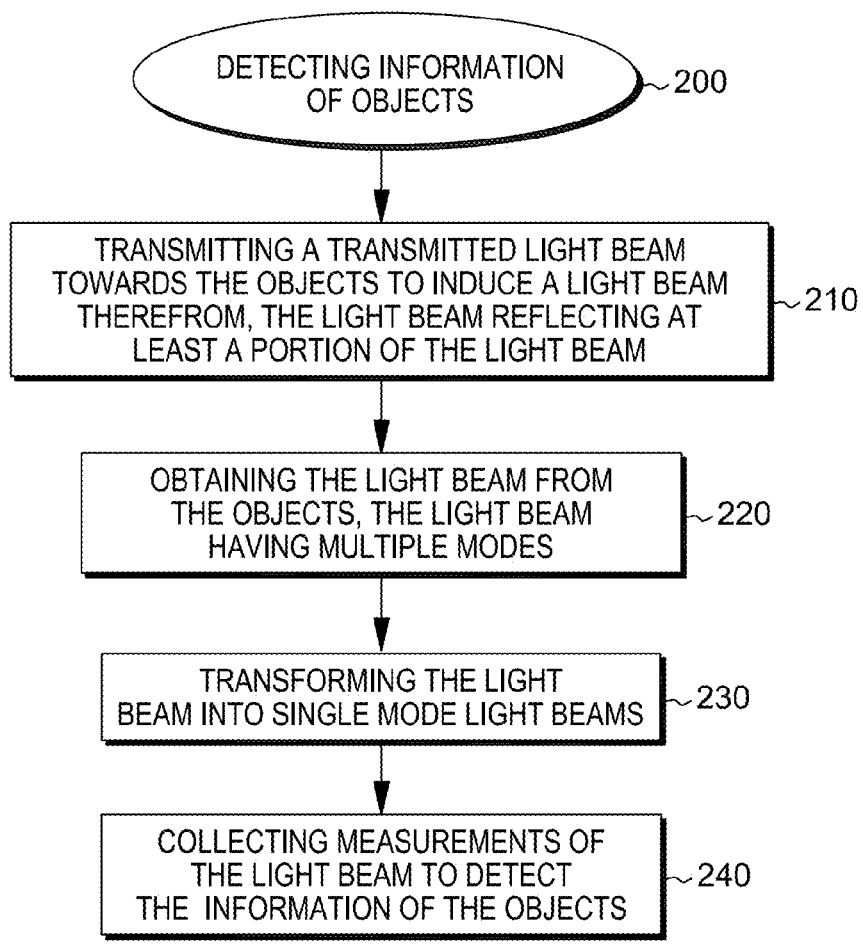
FIGS. 2A-2E depict multiple embodiments of processes for detecting information from light, in accordance with one or more aspects of the present invention.
Figure 2B:
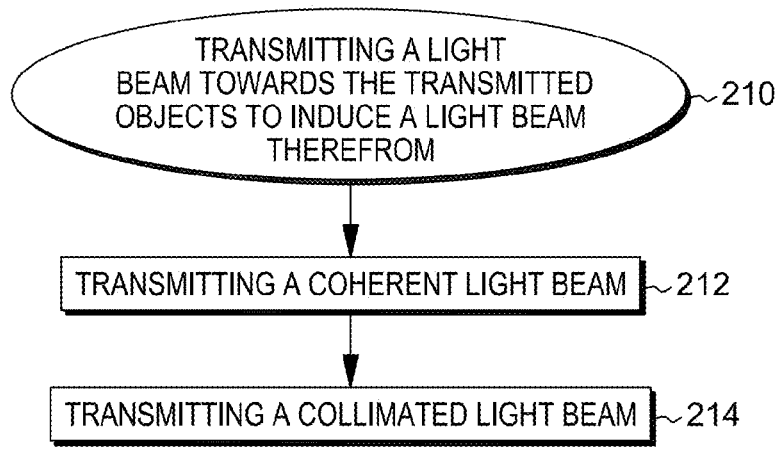

In the embodiment illustrated in FIG. 2A, the detecting includes: transmitting a transmitted light beam towards the objects to induce a light beam (or light) therefrom, the light beam (or light) reflecting at least a portion of the transmitted light beam 210; obtaining the light beam (or light) from the one or more objects, the light beam (or light), thus collected, comprising multiple modes 220; transforming the light beam (or light) into single mode light beams 230; and combining measurements of the single mode light beams, to detect the information of objects 240. As illustrated in FIG. 2B, in one example, the transmitter is transmitting a coherent light beam, such as a laser. In another example, the transmitter is transmitting a collimated light beam, which is a light beam that is not focused. In a further example, the light beam may be focused.

Figure 2C:
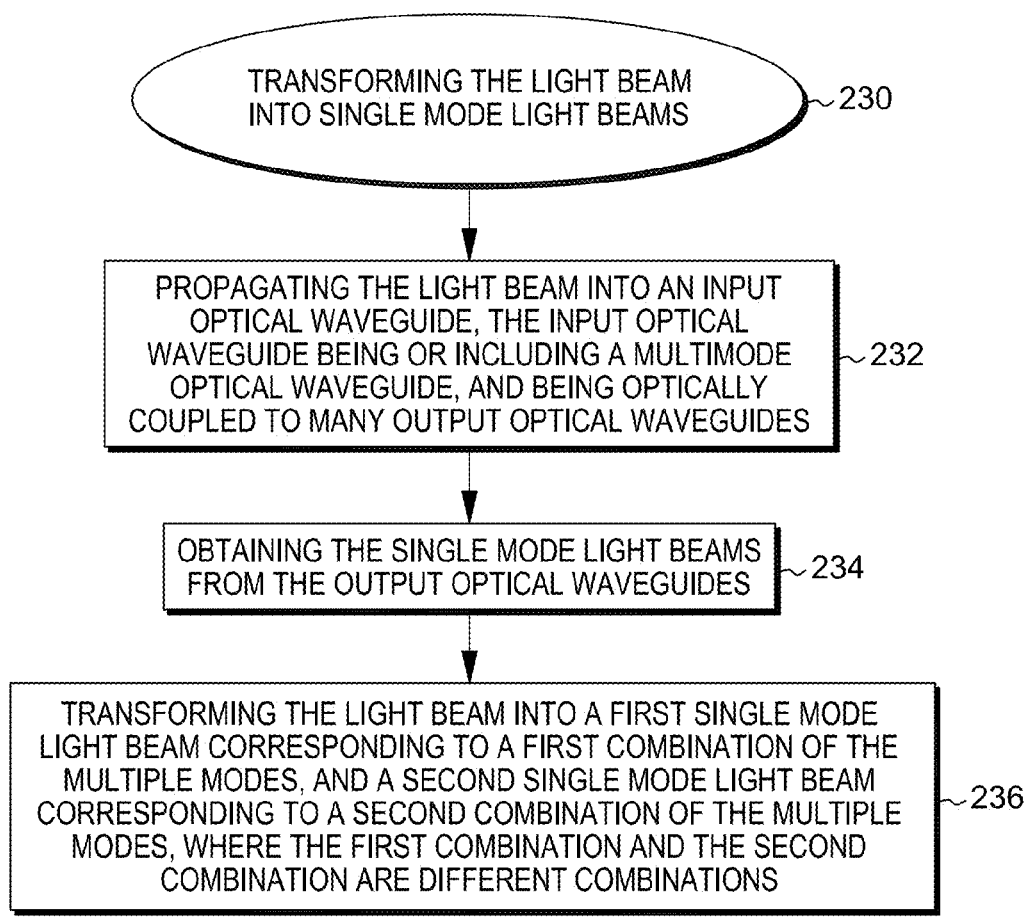

FIG. 2C illustrates another embodiment of a method for detecting information of objects, which includes transforming the light beam (or light) into single mode light beams 230. In the embodiment illustrated, the transforming includes: propagating the light beam (or light) into an input optical waveguide, the input optical waveguide comprising a multimode optical waveguide, and being optically coupled to many output optical waveguides 232; obtaining the single mode light beams from the output optical waveguides 234; and transforming the light beam (or light) into a first single mode light beam corresponding to a first combination of the multiple modes of the light beam (or light), and second single mode light beam corresponding to a second combination of the multiple modes of the light beam (or light), where the first combination and the second combination are different combinations 236. In addition, there may be any number of single mode light beams corresponding to combinations of the multiple modes. In this example, the single mode light beams each have a subset of the input signal.

Figure 2D:
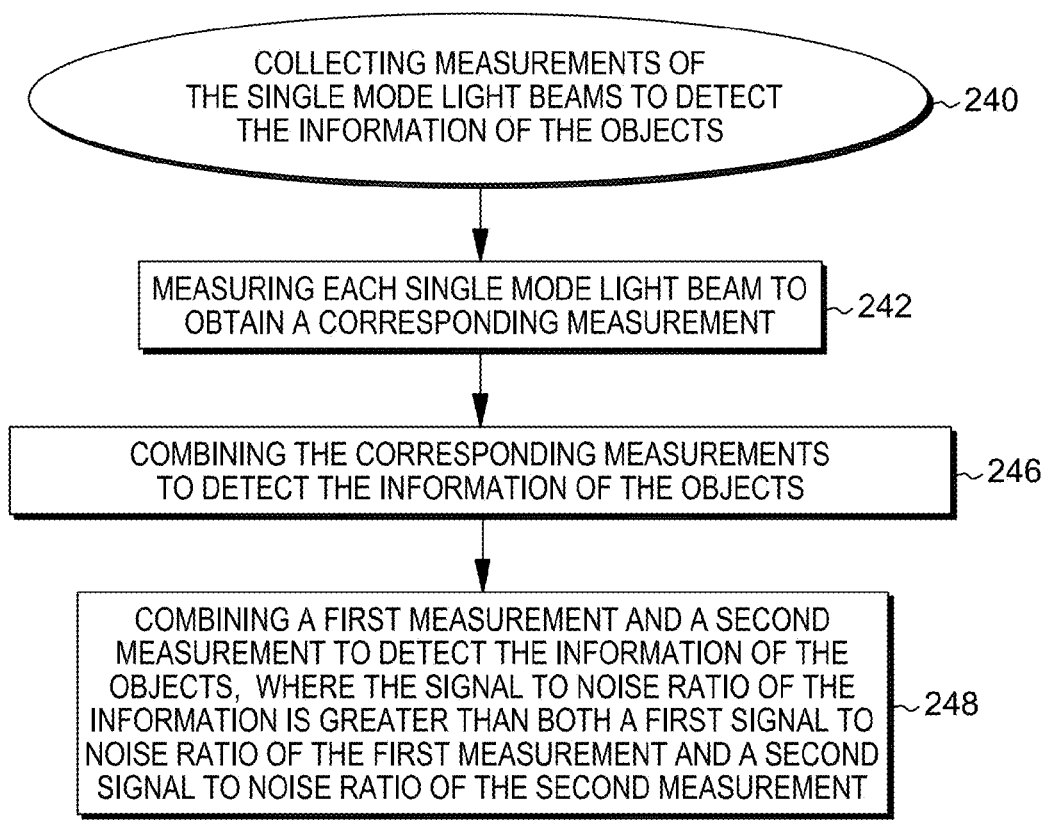
Figure 2E:
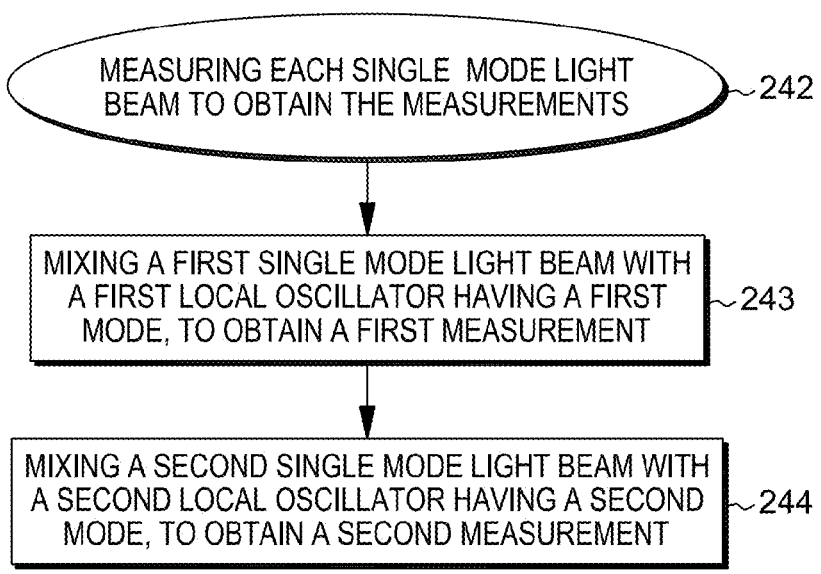

FIG. 2D illustrates a further embodiment of a method for detecting information of objects, which includes collecting measurements of the single mode light beams to detect information of the objects 240. As depicted, the collecting includes measuring each single mode light beam to obtain a corresponding measurement 242; combining the corresponding measurements to detect information of the objects 246; and/or combining a first measurement and a second measurement to detect information of the objects, where the signal to noise ratio of the information is greater than both a first signal to noise ratio of the first measurement and a second signal to noise ratio of the second measurement. As illustrated in FIG. 2E, measuring each single mode light beam 242 may include (in one embodiment): mixing a first single mode light beam with a first local oscillator having a first mode to obtain a first measurement 243; and mixing a second single mode light beam with a second local oscillator having a second mode to obtain a second measurement 244. In another embodiment, the first mode and the second mode may be different modes. In other examples, any number of single mode light beams may be mixed with any number of local oscillators to obtain any number of measurements.

Figure 3:
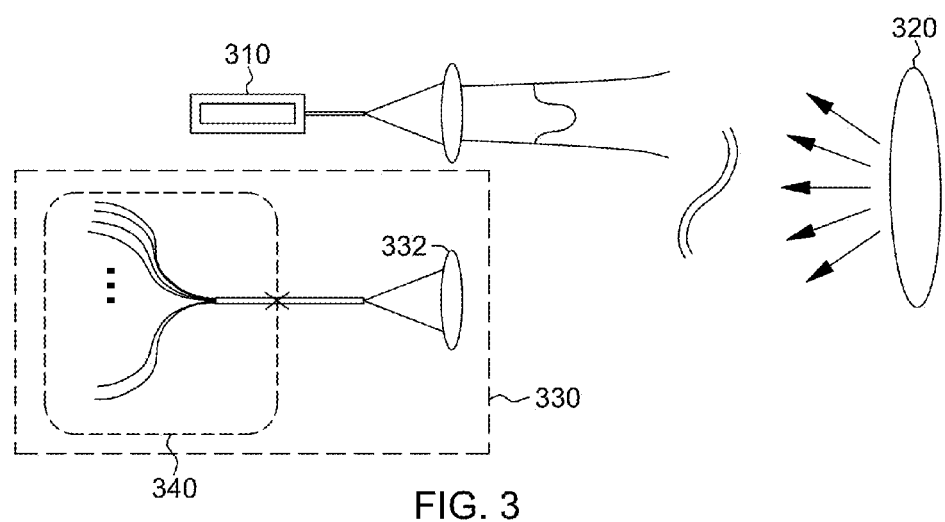
FIG. 3 depicts one embodiment of the device of FIG. 1, in accordance with one or more aspects of the present invention.

FIG. 3 illustrates an embodiment of the device of FIG. 1, in accordance with one or more aspects of the present invention. In the illustrated embodiment, device 300 includes a transmitter 310, which is configured to direct a transmitted light beam towards an object 320, from which light scatters (or reflects) towards a multimode detector 330. Continuing with this illustrative embodiment, a lens 332 receives the light, which is then obtained by multimode detector 330, which combines measurements of the light to detect information of objects 320. When light, such as transmitted light, interacts with object(s), the light may be absorbed by the object(s), transmitted through the object(s), or scattered by the object(s). Scattered light may be referred to as reflected light. In the illustrated embodiment, device 300 can receive and analyze any incident light, such as light scattered by an object, light generated by an object, light from a transmitter, or light from any potential source.

Lens 332 may be configured to collect more light than typical, single-mode collection systems, because multimode detector 330 is larger than a single mode equivalent detector, and includes a mode transformation device 340, which is capable of transforming collected light into multiple modes, in order to facilitate coherent detection of information from more than one spatial mode.

Figure 4:
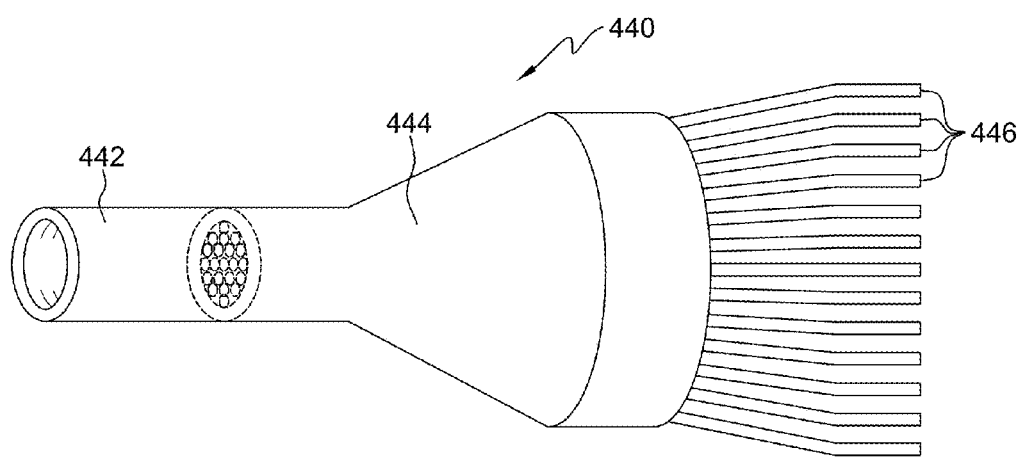
FIG. 4 depicts a mode transformation device having an input optical waveguide and a plurality of output optical waveguides, in accordance with one or more aspects of the present invention.

FIG. 4 illustrates a mode transformation device 440, in accordance with one or more aspects of the present invention. As illustrated, mode transformation device 440 includes an input optical waveguide 442 and a plurality of output optical waveguides 446. An optical coupling structure 444 couples input optical waveguide 442 to output optical waveguides 446. In one example, input optical waveguide 442 may be a multimode optical fiber, and output optical waveguides 446 may single mode optical fibers.

Devices such as photonic lanterns may be used for applications in astronomy. In a photonic lantern, multi-mode to single-mode converters are used, and include the ability to collect light into multi-mode fiber, followed by adiabatic mode transformation into multiple single modes, with subsequent transformation back to multimode fiber. Aspects of a photonic lantern can be incorporated into an embodiment of mode transformation device 440, but unlike a photonic lantern, mode transformation device 440 provides access to the multiple output single mode optical waveguides, each having a single mode light beam, and sends the multiple output single mode light beams to a collector, which has, for example, multiple optical receivers, for detecting information.

The astronomical applications of photonic lanterns differ from detection of information from objects in remote sensing applications, such as LIDAR, as disclosed herein. In an astronomical application, there is no transmitter, and there is no reflected light beam from an object. There is only received light from the astronomical object, mixed with potential known noise (for example, having known characteristics) from atmospheric or other sources. The goal of a photonic lantern is to throw away, or filter out, any of this known noise. Therefore, a photonic lantern makes use of filters to eliminate the known noise.

By contrast with astronomical applications, in a remote sensing application, the goal is to detect an unknown signal or object. Therefore, a mode transformation device 440 must preserve the unknown signal, and extract it. As described herein, one embodiment of a mode transformation device 440 extracts the information in the form of multiple single mode light beams. Additionally, in an embodiment of the present invention, mode transformation device 440 is used to enhance the collection of signal information from light, such as a reflected or scattered light beam. In some embodiments, mode transformation device 440 transforms the light into a plurality of single mode light beams.

Mode transformation device 440 provides a mechanism to collect the light into a multimode aperture, exciting multiple modes in the aperture and transforms the reflected light thus collected into a plurality of single mode light beams. Each single mode light beam may then be effectively mixed with a coherent optical local oscillator, to obtain information.

The number of modes excited in the multimode input optical waveguide may be proportional to the light cone or numerical aperture of the input waveguide. If the number of excited modes is approximately equal to the number of output optical waveguides, there is no intrinsic loss that must arise in the transformation process, and most of the input information may be transformed into output information, for further processing, such as detection. If the number of excited modes exceeds the number of output optical waveguides, there is intrinsic loss associated with the mode conversion process, and this loss increases as the number of excited modes diverges from the number of output optical waveguides.

Such a configuration may mitigate the noted effects of non-focused reflected light beams, which results in excitation of many modes in the detection system. This is because each single mode light beam can be detected, and the detected information combined to provide more signal than would otherwise be obtained from a single detector, enhancing the signal to noise ratio of the combined information.

In one example, mode transformation device 440 may be formed from multiple single mode fibers. The single mode fibers may be constructed at the same time, and one end of the fibers may be gathered together, heated in a furnace and drawn to a smaller diameter to reduce the radius of each individual single mode fiber. The assembly melds together in a taper to form an optical coupling structure 444. The melded together single mode fibers may be cut to expose an interface 447, which may include the core and cladding material of the original single mode fibers. The interface may be polished and coupled to a multimode optical fiber, forming mode transformation device 440.

In another example, a mode transformation device may be realized, using techniques of integrated optics, as a photonics integrated circuit. In one embodiment, a single chip mode transformation device may be available in silica, silicon or any other suitable integrated circuit technology. Such a chip could also include electronic circuitry, including other components of a device of the present invention, including for example, receivers, detectors, combiners, etc.

The precise adiabatic evolution by which multimode light, propagating in input optical waveguide 442, is transformed into multiple single mode light beams propagating in output optical waveguides 446 is in accordance with electromagnetic propagation equations (e.g. the wave equation), and in accordance with the detailed boundary conditions of the complex waveguide geometry. In practice, measurements may be made of the received light intensity, in order to determine the specific properties of each mode and tune mode transformation device 440.

Figure 5:
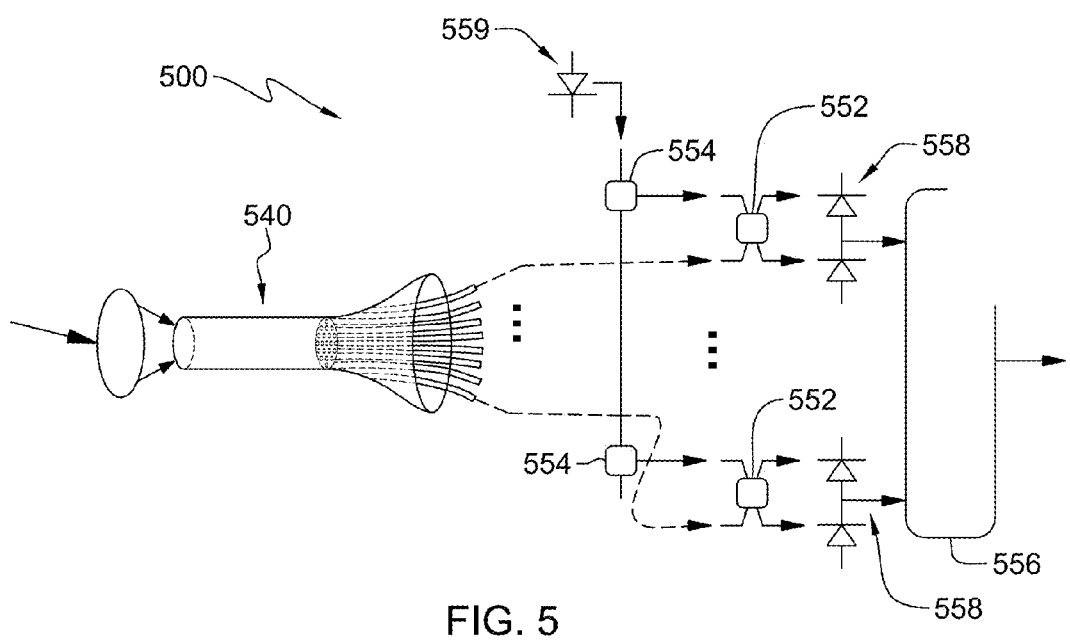
FIG. 5 depicts another embodiment of the device of FIG. 1, having multiple optical receivers configured to obtain measurements, in accordance with one or more aspects of the present invention.

FIG. 5 illustrates another embodiment of the device of FIG. 1, in accordance with one or more aspects of the present invention. As explained above, the light received by a device 500 includes multiple spatial modes. Traditional coherent optical detection methods are not well suited to detect information from multimode light, because in coherent optical detection, the spatial mode, frequency, and phase of an optical signal must be aligned with a local oscillator, in order to achieve the sensitivity and Doppler detection advantages of heterodyne and/or homodyne detection. The configuration of FIG. 5 alleviates these constraints of coherent detection systems, such as coherent LIDAR systems, because mode transformation device 540 transforms the multimode light into multiple single mode light beams. This allows coherent detection techniques to be used on each single mode light beam, allowing maximized optical collection and mixing efficiency.

In the embodiment illustrated in FIG. 5, device 550 combines each output single mode light beam of mode transformation device 540 with a local oscillator 559 through optical coupler 552, for detection of information by optical photo-receivers 558. The phase and power of each local oscillator can be adjusted to maximize the received signal to noise ratio at the output of each photo-receiver 558. In the example depicted, optical photo-receivers 558 are a pair of balanced photo-diodes. In addition, a single local oscillator 559 may be split for use in detection of information for each of the single mode light beams.

The output of the multiple optical photo-receivers 558 is combined by combiner 556 to detect information of objects. In one embodiment, combiner 556 is an electrical circuit and includes amplifiers, analog processing circuitry, analog to digital converters, and digital signal processing elements. In other examples, combiner 556 may include one or processors or computing elements. Combiner 556 may use other methods of detection processing such as matched filter detection and/or other waveform detection methods.

The techniques described above allow for detection of information from the light without the need to focus a transmitted light beam on a target, because device 500 is capable of detection of information from the multiple modes of the light, unlike coherent detection systems.

Figure 6A:
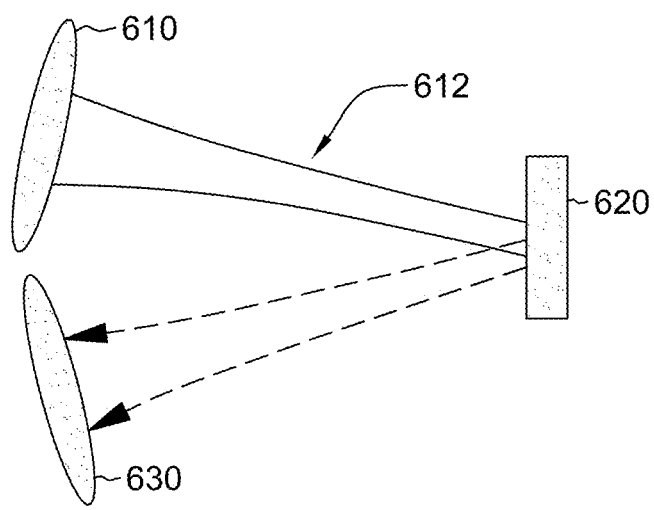
FIGS. 6A-6C depicts the performance of detectors configured to detect information from light, in accordance with one or more aspects of the present invention.
Figure 6B:
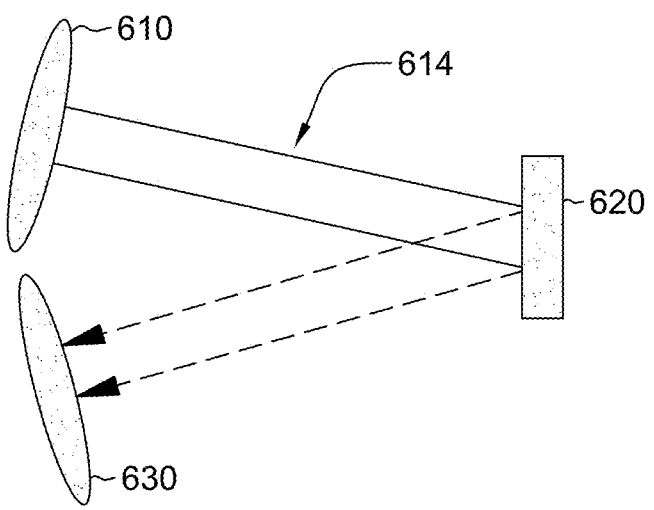
Figure 6C:
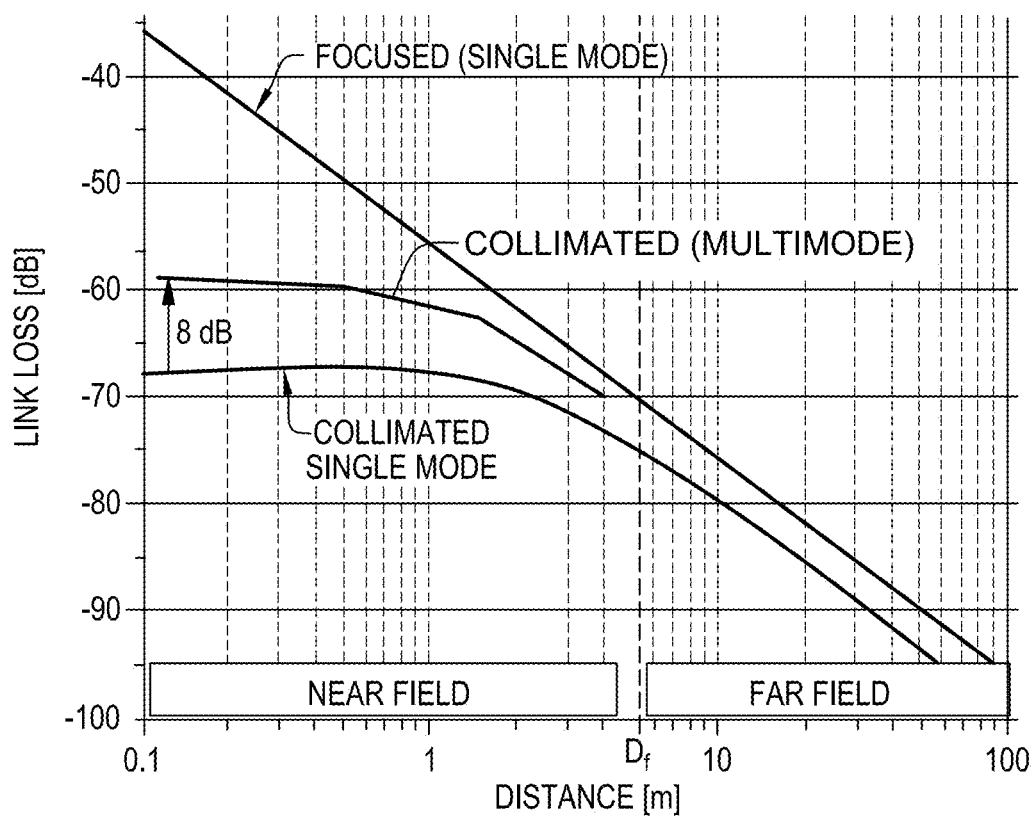

FIGS. 6A-6C depicts the performance of detectors configured to detect information of objects from light beams, in accordance with one or more aspects of the present invention. FIGS. 6A & 6B illustrate example single mode detector configurations, and FIG. 6C compares the single mode detector systems with one embodiment of a multimode detector system disclosed herein.

FIG. 6A illustrates the use of a focused light beam 612, and FIG. 6B illustrates the use of a collimated light beam 614, to detect information of objects. In both examples, a bi-static system is employed in which collecting lens supplies collected light to a fiber-based detection system, using either a single mode or a multi-mode transformation devices of the type described herein. A transmitter 610 transmits the light beam towards a diffuse target object 620.

FIG. 6C illustrates the collected power as a function of the position of a diffuse target object, and shows results for the two cases of FIGS. 6A-6B with a single mode fiber collection device, along with exemplary results for the device of FIG. 1, employing a multimode detector as described herein. As demonstrated, in the far field of the transmitter, the results exhibit similar behavior for all three cases, in that received power increases as the object is closer to the detector, with an advantage arising for the device of FIG. 1 due to its larger collecting area.

However, once the object is within the Fraunhofer distance, the image plane of the target is formed behind the focal point of the transmitter for a collimated transmitted beam. Therefore, the reflected beam has a greater area than the detector (signal over-fills the detector), and collected power hits a saturation point, and the received power does not increase as the object gets closer to the transmitter. However, in one embodiment, a multimode detector, as described with respect to FIGS. 1-5, is larger than its single mode counterpart and has 8 dB greater received signal than single mode detectors, for the case of collimated transmitted light.

By using the techniques disclosed herein, a greater received signal, which includes information content in multiple modes, may be used to detect a greater amount of information from light beams (which could be reflected or scattered from objects), than possible using single mode detectors. As explained above, unless the position of an object is known, the transmitted light beam cannot be focused on the object. Thus, the techniques described herein demonstrate significant advantages in received power of light beams, including reflected or scattered light beams from objects, leading to enhanced detection of information of such objects, with enhanced signal to noise ratio.

Below, Example 1 is a recitation of an embodiment of at least one aspect of the present invention.

EXAMPLE 1

Example 1 relates to technology to enhance the coherent collection efficiency and mitigate focusing effects in a coherent LIDAR by collecting more of the different modes and transforming them to single modes with which a single-mode local oscillator may be effectively employed for coherent detection.

Coherent LIDAR is known to offer advantages in light detection and ranging (LIDAR) applications, arising from the use of a local oscillator (LO) to perform heterodyne and/or homodyne detection of an incoming signal. This is only possible when the incoming signal and the local oscillator have a phase and spatial mode coherent relationship to one another. That is, the spatial mode and the frequency and/or phase of the optical signal must be aligned to one another to achieve the sensitivity and Doppler detection advantages of heterodyne and/or homodyne detection.

Coherent optical methods are known to offer advantages in light detection and ranging (LIDAR) applications, arising from the use of a local oscillator (LO) to perform heterodyne or homodyne detection of an incoming signal. Relative to intensity detection, coherent LIDAR incurs an additional efficiency penalty when there is poor mode matching between the incoming signal and LO. This can arise when the collected signal has been scattered from a diffuse object, or if the transmitted light beam is not focused on the target. The result is a large collection of modes arriving at the receiver that are not well matched to the LO, which is typically single mode. The need to focus on the target in a coherent LIDAR system when targets are within the collimated beam Fraunhofer distance creates significant limitations on the coherent LIDAR system, since focusing can require mechanical adjustment of a lens, resulting in complexity and size, weight and power penalties. Further, the position of the target may not be known, resulting in serious degradation of the return signal if it cannot be localized and focused upon. A need therefore exists for better ways to efficiently collect light for use in a coherent LIDAR system.

In LIDAR, a coherent optical signal is reflected from a diffuse object, resulting in randomization of the reflected signal phase. The ideal far-field coherent collection efficiency has been analyzed. Applicants have measured light collection from diffuse reflectors into single mode fiber, which is a good proxy for coherent overlap of the return signal with a single mode local oscillator, in this case replaced by the single mode supported by the fiber. Applicants found an effect resulting in a loss of power relative to the total power incident on the collection optic as modeled by conventional theory (e.g., the range equation for radar or LIDAR systems) and verified with large area detectors. This effect is dependent on the collection optic and the distance, and is observed because signals do not obey the 'far field' ideal assumptions. The effect is mitigated by focusing. These observations have been imperfectly or partially described elsewhere. Recently described multimode to single mode converters have described the ability to collect light into multi-mode fiber, followed by adiabatic mode transformation into multiple single modes, with subsequent transition back to multi-mode fiber, for application in astronomy such as photonic lanterns.

Example 1 pertains to techniques for improving light detection and ranging (LIDAR) technology, is a critical element in acquiring 3 dimensional situational awareness (e.g., mapping an environment). This capability is used in such diverse applications as autonomous navigation, wide area terrain mapping, standoff face recognition, and machine vision and remote assembly. Example 1 alleviates a major constraint of coherent LIDAR systems, the need to focus the output optical signal on the target to maximize optical collection and mixing efficiency. Being a mechanical operation, focusing imposes penalties on throughput and size, weight, and power that can be detrimental to many applications. Through Example 1 use of a mode transforming collection device, multi-mode collection can be transformed to multiple single mode outputs for which high coherent mixing efficiency is possible. This can result in significantly enhanced light collection, alleviating the need for focusing, which in turn results in desirable increased range, rate, or resolution in a LIDAR system. Example 1 can be applied to all types of coherent LIDAR to increase its usefulness. Further, it offers the potential to collect more light than when restricted to a single spatial mode by offering the ability to transform collected light that would not overlap well with a single mode local oscillator into a mode that will mix efficiently.

Since coherent optical LIDAR is predominantly used in atmospheric studies, the need to focus light to maximize the signal return is not as big an issue, since focusing on that region of the atmosphere from which data is to be acquired can be useful to suppress return signals from undesirable portions of the atmosphere.

Other solutions to this problem require focusing of the interrogating signal on the target, which as mentioned creates mechanical motion requirements that impose throughput, size, weight and power limitations on the resulting system. Photonic lantern devices have been created for use in astronomical applications. The astronomical application differs from LIDAR and remote sensing application in several ways. One of these is that for the astronomical application the object is always in the far field of the optical instrument. In the LIDAR application, this is not always the case.

The most common LIDAR applications are relatively long distance applications. Thus, objects are generally in the far field of the optical element, for which coherent collection efficiency is well known and in which focusing penalties are not evident. Furthermore, scattering from diffuse targets at unknown range is most often applied with direct detection systems, and again, focusing penalties do not arise. It can thus be appreciated that the unique dimensions of the application space for enhanced near-field coherent LIDAR signal collection make Example 1 unique.

There have been analyses of the theoretical maximum collection efficiency of a single mode fiber coupled LIDAR system, which have shown that it is essentially the same as that of a free space collection system for coherent purposes. These theoretical limits do not apply to a multi-mode collection system, the ultimate multi-mode collection system is a large area photodiode at the focus of an optical system, whose collection efficiency is well described by the well-known LIDAR (radar) range equations, published in many textbooks and reference articles.

Applicants have discovered that multimode detection technology can be useful to enhance the coherent collection efficiency and mitigate focusing effects in a coherent LIDAR by collecting more of the different modes and transforming them to single modes with which a local oscillator may be effectively employed for coherent detection. In Example 1, a device is used in a collection head for a LIDAR system and the multiple single mode fibers are then interfaced to an array of coherent optical receivers that mix the single mode light with a single mode local oscillator on a detector to measure the light reflected from the target. These signals can be combined to provide more signal than would otherwise be obtained from a single detector.

Example 1 relies on the ability to collect light into a multi-mode waveguide. Once so collected, mode transformation may be applied in the waveguide so that modes may be separated and coupled to individual single mode waveguides. Each single mode waveguide may then be efficiently mixed with a single mode LO, and the result fed to an electrical detector. The individual outputs of the detectors can then be combined so that the resulting SNR is enhanced compared to the case in which the mode transforming collection device is not employed. An example of such a multi-mode to multiple-single-mode collection device is a recently described 'photonic lantern' device realized in multi-mode fiber and described in the open literature. Other such multi-mode to multiple-single-mode conversion elements can be envisioned, such as might be realized in integrated optics.

Presented is experimental data for collection of light from a diffuse target with a large area detector and a single-mode (SMF-28) fiber coupled detector. A bi-static (e.g., two lens) configuration is employed in which a free-space fiber coupler is used to launch laser light towards a fully resolved (e.g., large) diffuse scattering target. A second fiber coupler is used to collect light for measurement of the collected power with either a large area detector in place of the fiber, or a single mode fiber. In one case, light is focused on the object, and in another case, a collimated beam is employed. Data demonstrate that if light is focused on the object, collection efficiency is strongly dependent on the object position and approximates the light collected with a large area detector when aligned to the focus of the beam. If light is collimated and a large area detector is employed, collection efficiency coincides with the well known LIDAR (RADAR) range equation, while the use of a single mode fiber with collimated beam results in a saturation of the collected power at distances approximating the Fraunhofer distance for near-field/far-field approximation.

We expect the potential benefits of the photonic lantern-based LIDAR system to reflect this comparison, because the photonic lantern essentially provides a mechanism to collect into a multi-mode aperture but transform the outputs into a collection of individual single mode signals that can be effectively mixed with a coherent optical local oscillator.

The limits of the effectiveness of the lantern in doing so are outlined in the descriptions of the lantern provided in the literature, which point out that the number of modes excited in the multi-mode fiber is proportional to 'light cone' or numerical aperture entering the fiber. When the number of excited modes exceeds the number of cores in the lantern, lossy transformation of modes results. Example 1 seeks to increase near field collection efficiency of arrays of single mode collectors and eliminate or reduce focusing penalties. Provided are the results of a model of the collected optical power in the case of a large area detector, a detector coupled to single-mode fiber (referred to as standard single mode fiber, or SMF-28), and a detector coupled to multi-mode fiber, in this case a 50 micron core graded index fiber. The model is based on the variation in image size at the focal point of the collecting lens (a fiber collimator engineered to illuminate the fiber end face for a point source in the far field). In this case, matched collecting and collimating lenses of focal length 11 mm and effective clear apertures of 2.1 mm for the SMF-28 and 3.22 mm for the 50 micron MMF were assumed (note that the effective clear aperture is bigger for the MMF due to the higher numerical aperture). As the target approaches the collecting lens, the far field approximation breaks down and the image of the target is formed behind the focal point of the collimator and thus at the location of the fiber or detector, the spot size progressively increases until it exceeds that of the collecting fiber, saturating the light hitting the detector in this case. In the case of a large area detector placed at the location of the fiber, this does not occur, and an amount of light determined by the numerical aperture of the collecting lens (here assumed to match that of the fiber it was intended to be used with) and LIDAR/RADAR range equation is collected. We can see that saturation of the detector output occurs at ~10 dB more power for the multi-mode case than for the single mode case, because of both the larger size collecting region and the larger numerical aperture supported by the multi-mode fiber. The scale parameter appropriate to determine when saturation will occur is the Fraunhofer distance.

The Fraunhofer distance approximates the transition from near-field to far-field approximation for a given aperture size. Thus, for larger lenses, the point at which this may arise can be significant (e.g., this distance is 82.5 m for a 0.8 cm aperture at $\lambda$=1.55 micron, and 290 m for a 1.5 cm aperture).

The differential between single mode and multi-mode collection efficiency is dependent on the numerical aperture of the fiber and the size of the collecting area. In this case, a benefit of ~10 dB is predicted for collection of collimated light. As noted in FIG. 2, focusing can recover the full collection of a broad area detector. However, the requirement to focus can introduce deleterious effects in a practical system, such as the introduction of mechanical elements, as noted previously. The maximum benefit of the photonic lantern in this case will depend on the number of lantern cores included in the fiber, which describes the maximum number of modes that can be losslessly transformed. The number of modes in one polarization excited is approximately $V^2/4$, where $V=2\pi/\lambda$ (aNA), where NA is the numerical aperture, 'a' is the fiber core radius, and $\lambda$ is the wavelength. For a step index multi mode fiber, the NA is given by the difference between core ($n_{co}$) and cladding ($n_{cl}$) refractive index as $NA=(n_{co}^2-n_{cl}^2)^{1/2}$. The number of modes excited can be restricted by exciting the fiber with a lower numerical aperture input. To avoid excess loss in the mode transformation, the number of modes excited should match to the number of cores in the lantern device. This can be done through a combination of fiber design as well as optical system design.

Since higher light collection is possible with higher numerical aperture, there is thus a trade-off between the light collection enhancement and the number of cores, and ultimately the number of receivers that will be needed. Example 1 takes advantage of the potential for increased coherent collection efficiency using a photonic lantern mode transformer with a multi-mode fiber collection element. Light is collected with a multi-mode collection lens and fiber coupling arrangement similar to that described previously, but the multi-mode fiber is substituted with a photonic lantern having a various number of cores. Through the action of the lantern device, the multiple modes excited in the multimode fiber through the collection optic are transformed to multiple single mode outputs. Each of these output cores is then coupled with a local oscillator through a coupler arrangement using fiber optic and integrated optic practitioners that allows combining light from two or more single mode fibers. In this case, an array of 2×2 couplers are envisioned with a single local oscillator that is split in equal parts (or unequal parts, if it is desirable to do so) to each coupler element, thereby combining single mode light from the local oscillator with the mode transformed single mode light from each core of the photonic lantern device. The resulting superposition of local oscillator and collected light is detected in a coherent optical receiver comprising one or more photodiodes (here a balanced photodiode pair is illustrated, but other configurations could be used). The detected signals are then processed together electronically and combined to yield an output signal. The output signal will derive benefits of increased signal to noise relative to the single mode fiber case because of the increased power detected. More sophisticated detection processing can also be applied to achieve various specific goals. These could include matched filter detection or other transmit waveform detection methods. It should be noted that the detected lantern signals may comprise independent samples of the speckle field on the target. If so, then speckle averaging may result from combination of the received signals, much as the use of detector arrays has been described to provide reduction in speckle noise. This will depend on the details of the beam/target interaction.

Other examples of utility of the system would be apparent to those skilled in the art of atmospheric propagation and coherent systems and are not limited to those described here. For instance, in addition to enhancing coherent light collection efficiency for LIDAR, the system would be useful in any situation in which light collection efficiency for coherent operation is desirable. A potentially useful example of additional utility is a coherent free space optical communication system in which significant atmospheric turbulence or other scattering replicates in part the behavior of the diffuse target previously discussed and creates disturbances to the beam. The photonic lantern collection device could be utilized to increase the coherent collection efficiency by allowing multi-mode collection followed by single mode conversion, thereby increasing mixing efficiency of the collected light and possibly providing scintillation averaging in the same manner as mentioned earlier for speckle.

Accordingly, a small sample of combinations set forth in Example 1 are in the following sections, designated A1 to C2.

A1. A device comprising: a multimode detector, the multimode detector being configured to obtain light from one or more objects, the light having multiple modes, and combine a plurality of measurements of the light to detect information of the one or more objects, and the multimode detector comprising: a mode transformation device, the mode transformation device being configured to transform the light into a plurality of single mode light beams, wherein each measurement of the plurality of measurements of the light is a measurement of a corresponding single mode light beam of the plurality of single mode light beams.

A2. The device of A1, wherein the mode transformation device comprises: an input optical waveguide, the input optical waveguide comprising a multimode optical waveguide, and being capable of obtaining and propagating the light; a plurality of output optical waveguides, each output optical waveguide of the plurality of output optical waveguides comprising a single mode optical waveguide, and being capable of propagating a corresponding single mode light beam of the plurality of single mode light beams; and an optical coupling structure, the optical coupling structure coupling the input optical waveguide to the plurality of output optical waveguides, and being capable of transforming the light into the plurality of single mode light beams.

A3. The device of A2, wherein the input optical waveguide comprises a multimode optical fiber, the plurality of output optical waveguides comprises a plurality of single mode optical fibers, and the optical coupling structure comprises a tapered region optically coupling the multimode optical fiber with the plurality of single mode optical fibers.

A4. The device of A1, wherein a first single mode light beam of the plurality of single mode light beams corresponds to a first combination of the multiple modes of the light, and a second single mode light beam of the plurality single mode light beams corresponds to a second combination of the multiple modes of the light, the first combination and the second combination being different combinations.

A5. The device of A1, wherein the plurality of single mode light beams corresponds to a plurality of superpositions of the multiple modes of the light.

A6. The device of A1, wherein the multimode detector further comprises: a first optical receiver, the first optical receiver comprising a first local oscillator, wherein the first optical receiver is configured to mix a first single mode light beam of the plurality of single mode light beams with the first local oscillator to obtain a first measurement of the plurality of measurements; and a second optical receiver, the second optical receiver comprising a second local oscillator, wherein the second optical receiver is configured to mix a second single mode light beam of the plurality of single mode light beams with the second local oscillator to obtain a second measurement of the plurality of measurements.

A7. The device of A1, wherein the multimode detector further comprises a plurality of optical receivers and a local oscillator, each optical receiver of the plurality of optical receivers being configured to mix a corresponding single mode light beam of the plurality of single mode light beams with the local oscillator to obtain the plurality of measurements.

A8. The device of A1, wherein the multimode detector is configured to combine a first measurement of the plurality of measurements and a second measurement of the plurality of measurements to detect the information of the one or more objects, and the first measurement has a first signal to noise ratio, the second measurement has a second signal to noise ratio, and the information has a combined signal to noise ratio, wherein the combined signal to noise ratio is greater than both the first signal to noise ratio and the second signal to noise ratio.

A9. The device of A1, further comprising a transmitter, the transmitter being configured to direct a transmitted light beam towards the one or more objects, the one or more objects being capable of reflecting at least a portion of the transmitted light beam as the light directed towards the device.

A10. The device of A9, wherein the transmitted light beam is a coherent laser beam, and the transmitter is configured to direct the coherent laser beam towards the one or more objects.

A11. The device of A1, wherein the one or more objects comprises a hard target.

A12. The device A1, wherein the one or more objects comprises a soft target.

B1. A method comprising: detecting information of one or more objects, the detecting comprising: obtaining light from the one or more objects, the light comprising multiple modes; transforming the light into a plurality of single mode light beams; and collecting a plurality of measurements of the light, each measurement of the plurality of measurements being a measurement of a corresponding single mode light beam of the plurality of single mode light beams, to detect the information of the one or more objects.

B2. The method of B1, wherein the transforming comprises: propagating the light into an input optical waveguide, the input optical waveguide comprising a multimode optical waveguide, and being optically coupled to a plurality of output optical waveguides; and obtaining the plurality of single mode light beams from the plurality of output optical waveguides.

B3. The method of B1, wherein the transforming comprises: transforming the light into a first single mode light beam of the plurality of single mode light beams, the first single mode light beam corresponding to a first combination of the multiple modes of the light, and a second single mode light beam of the plurality single mode light beams, the second single mode light beam corresponding to a second combination of the multiple modes of the light, wherein the first combination and the second combination are different combinations.

B4. The method of B1, wherein the transforming comprises combining the multiple modes of the light into a plurality of combinations, the plurality of combinations corresponding to the plurality of single mode light beams.

B5. The method of B1, wherein the collecting comprises: measuring the plurality of single mode light beams to obtain the plurality of measurements, the measuring comprising: measuring a first single mode light beam of the plurality of single mode light beams to obtain a first measurement of the plurality of measurements, the first measurement having a first signal to noise ratio; measuring a second single mode light beam of the plurality of single mode light beams to obtain a second measurement of the plurality of measurements, the second measurement having a second signal to noise ratio; and combining the first measurement and the second measurement to detect the information of the one or more objects, the information having a combined signal to noise ratio, wherein the combined signal to noise ratio is greater than both the first signal to noise ratio and the second signal to noise ratio.

B6. The method of B4, wherein measuring the plurality of single mode light beams comprises: mixing the first single mode light beam of the plurality of single mode light beams with a first local oscillator to obtain the first measurement of the plurality of measurements; and mixing the second single mode light beam of the plurality of single mode light beams with a second local oscillator to obtain the second measurement of the plurality of measurements.

B7. The method of B1, further comprising: transmitting a transmitted light beam towards the one or more objects to induce the light therefrom, the light reflecting at least a portion of the transmitted light beam.

B8. The method of B1, wherein the information comprises one of position information or velocity information of the one or more objects, and the detecting comprises detecting one of the position information or the velocity information of the one or more objects.

B9. The method of B1, wherein the information comprises chemical information of the one or more objects, and the detecting comprises detecting the chemical information of the one or more objects.

C1. A device comprising: a transmitter, the transmitter being configured to transmit a light beam, the light beam comprising a plurality of modes; and a multimode detector, the multimode detector being configured to obtain the light beam, and combine a plurality of measurements of the light beam to detect information, wherein each measurement of the plurality of measurements of the light beam corresponds to a mode of the plurality of modes of the light beam.

C2. The device of C1, wherein the multimode detector comprises: a mode transformation device, the mode transformation device being configured to transform the light beam into a plurality of single mode light beams, wherein each measurement of the plurality of measurements of the light beam is a measurement of a corresponding single mode light beam of the plurality of single mode light beams.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A device comprising:
a multimode detector, the multimode detector being configured to obtain light from one or more objects, the light having multiple modes, and to combine a plurality of measurements of the light to detect information of the one or more objects, and the multimode detector comprising:
a mode transformation device, the mode transformation device being configured to transform the light into a plurality of single mode light beams, wherein each measurement of the plurality of measurements of the light is a measurement of a corresponding single mode light beam of the plurality of single mode light beams, wherein the multimode detector is configured to combine a first measurement of the plurality of measurements and a second measurement of the plurality of measurements to detect the information of the one or more objects, and the first measurement has a first signal to noise ratio, the second measurement has a second signal to noise ratio, and the information has a combined signal to noise ratio, wherein the combined signal to noise ratio is greater than both the first signal to noise ratio and the second signal to noise ratio.

2. The device of claim 1, wherein the mode transformation device comprises:
an input optical waveguide, the input optical waveguide comprising a multimode optical waveguide, and being capable of obtaining and propagating the light;
a plurality of output optical waveguides, each output optical waveguide of the plurality of output optical waveguides comprising a single mode optical waveguide, and being capable of propagating a corresponding single mode light beam of the plurality of single mode light beams; and
an optical coupling structure, the optical coupling structure coupling the input optical waveguide to the plurality of output optical waveguides, and being capable of transforming the light into the plurality of single mode light beams.

3. The device of claim 2, wherein the input optical waveguide comprises a multimode optical fiber, the plurality of output optical waveguides comprises a plurality of single mode optical fibers, and the optical coupling structure comprises a tapered region optically coupling the multimode optical fiber with the plurality of single mode optical fibers.

4. The device of claim 1, wherein a first single mode light beam of the plurality of single mode light beams corresponds to a first combination of the multiple modes of the light, and a second single mode light beam of the plurality single mode light beams corresponds to a second combination of the multiple modes of the light, the first combination and the second combination being different combinations.

5. The device of claim 1, wherein the plurality of single mode light beams corresponds to a plurality of superpositions of the multiple modes of the light.

6. The device of claim 1, wherein the multimode detector further comprises:
a first optical receiver, the first optical receiver comprising a first local oscillator, wherein the first optical receiver is configured to mix a first single mode light beam of the plurality of single mode light beams with the first local oscillator to obtain a first measurement of the plurality of measurements; and
a second optical receiver, the second optical receiver comprising a second local oscillator, wherein the second optical receiver is configured to mix a second single mode light beam of the plurality of single mode light beams with the second local oscillator to obtain a second measurement of the plurality of measurements.

7. The device of claim 1, wherein the multimode detector further comprises a plurality of optical receivers and a local oscillator, each optical receiver of the plurality of optical receivers being configured to mix a corresponding single mode light beam of the plurality of single mode light beams with the local oscillator to obtain the plurality of measurements.

8. The device of claim 1, further comprising a transmitter, the transmitter being configured to direct a transmitted light beam towards the one or more objects, the one or more objects being capable of reflecting at least a portion of the transmitted light beam as the light directed towards the device.

9. The device of claim 8, wherein the transmitted light beam is a coherent laser beam, and the transmitter is configured to direct the coherent laser beam towards the one or more objects.

10. The device of claim 1, wherein the one or more objects comprises a hard target.

11. The device of claim 1, wherein the one or more objects comprises a soft target.

12. A method comprising:
detecting information of one or more objects, the detecting comprising:
obtaining light from the one or more objects, the light comprising multiple modes;
transforming the light into a plurality of single mode light beams; and
collecting a plurality of measurements of the light, each measurement of the plurality of measurements being a measurement of a corresponding single mode light beam of the plurality of single mode light beams, to detect the information of the one or more objects, the collecting comprising:
measuring the plurality of single mode light beams to obtain the plurality of measurements, the measuring comprising:
measuring a first single mode light beam of the plurality of single mode light beams to obtain a first measurement of the plurality of measurements, the first measurement having a first signal to noise ratio;
measuring a second single mode light beam of the plurality of single mode light beams to obtain a second measurement of the plurality of measurements, the second measurement having a second signal to noise ratio; and
combining the first measurement and the second measurement to detect the information of the one or more objects, the information having a combined signal to noise ratio, wherein the combined signal to noise ratio is greater than both the first signal to noise ratio and the second signal to noise ratio.

13. The method of claim 12, wherein the transforming comprises:
propagating the light into an input optical waveguide, the input optical waveguide comprising a multimode optical waveguide, and being optically coupled to a plurality of output optical waveguides; and obtaining the plurality of single mode light beams from the plurality of output optical waveguides.

14. The method of claim 12, wherein the transforming comprises:

transforming the light into a first single mode light beam of the plurality of single mode light beams, the first single mode light beam corresponding to a first combination of the multiple modes of the light, and a second single mode light beam of the plurality single mode light beams, the second single mode light beam corresponding to a second combination of the multiple modes of the light, wherein the first combination and the second combination are different combinations.

15. The method of claim 12, wherein the transforming comprises combining the multiple modes of the light into a plurality of combinations, the plurality of combinations corresponding to the plurality of single mode light beams.

16. The method of claim 12, wherein measuring the plurality of single mode light beams comprises:

mixing the first single mode light beam of the plurality of single mode light beams with a first local oscillator to obtain the first measurement of the plurality of measurements; and mixing the second single mode light beam of the plurality of single mode light beams with a second local oscillator to obtain the second measurement of the plurality of measurements.

17. The method of claim 12, further comprising:

transmitting a transmitted light beam towards the one or more objects to induce the light therefrom, the light comprising at least a reflected portion of the transmitted light beam.

18. The method of claim 12, wherein the information comprises one of position information or velocity information of the one or more objects, and the detecting comprises detecting one of the position information or the velocity information of the one or more objects.

19. The method of claim 12, wherein the information comprises chemical information of the one or more objects, and the detecting comprises detecting the chemical information of the one or more objects.

20. A device comprising:

a transmitter, the transmitter being configured to transmit a light beam; and a multimode detector, the multimode detector being configured to obtain at least a portion of the light beam, the light beam having a plurality of modes, and to combine a plurality of measurements of the light beam to detect information, wherein each measurement of the plurality of measurements of the light beam corresponds to one or more modes of the plurality of modes of the light beam, and wherein the multimode detector is further configured to combine a first measurement of the plurality of measurements and a second measurement of the plurality of measurements to detect the information of the one or more objects, and the first measurement has a first signal to noise ratio, the second measurement has a second signal to noise ratio, and the information has a combined signal to noise ratio, wherein the combined signal to noise ratio is greater than both the first signal to noise ratio and the second signal to noise ratio.

21. The device of claim 20, wherein the multimode detector comprises:

a mode transformation device, the mode transformation device being configured to transform the light beam into a plurality of single mode light beams, wherein each measurement of the plurality of measurements of the light beam is a measurement of a corresponding single mode light beam of the plurality of single mode light beams.

* * * * *